June 12, 1956     W. GRASSMANN ET AL     2,750,092
APPARATUS FOR AUTOMATICALLY FILLING UNIFORM
AND EXACT VOLUMES, IN PARTICULAR A FULLY
AUTOMATIC COLLECTOR OF FRACTIONS
Filed May 25, 1953     2 Sheets-Sheet 1
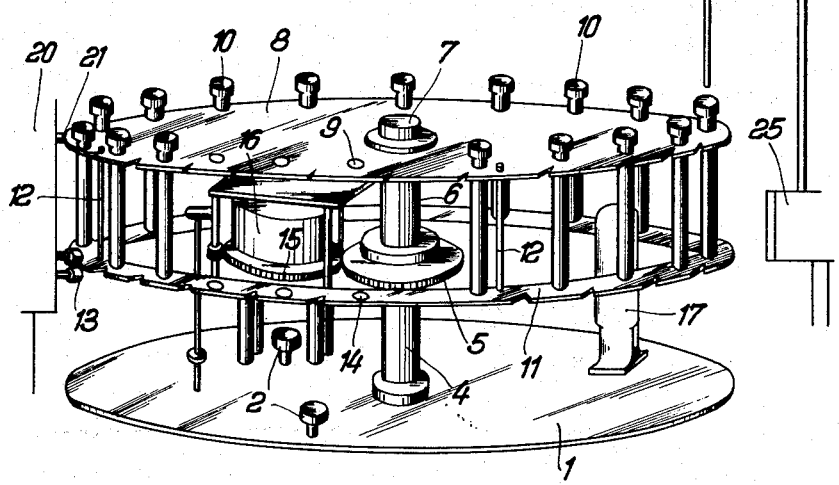
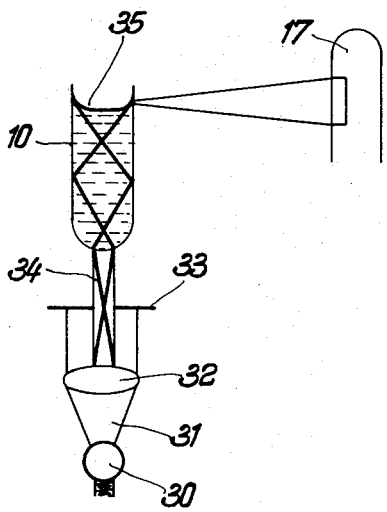
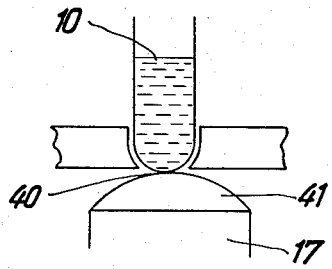
Inventors
Wolfgang Grassmann, Gottfried Deffner
by
Attorney

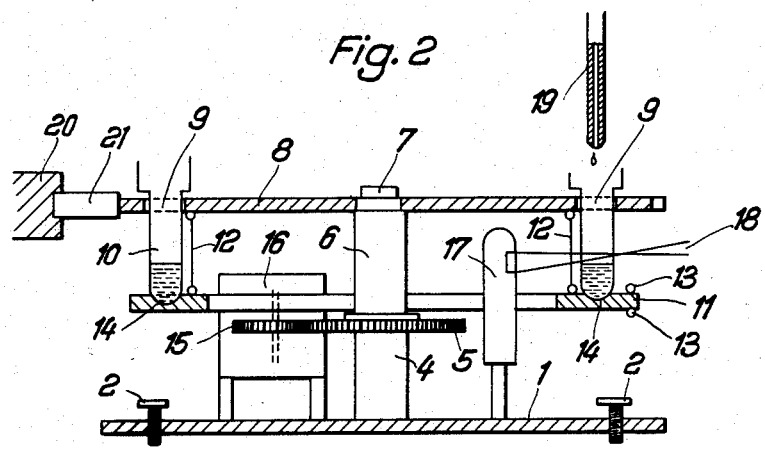
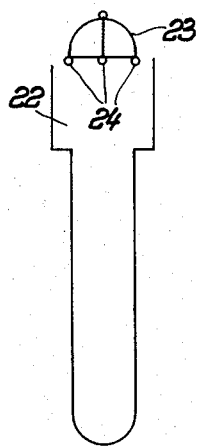
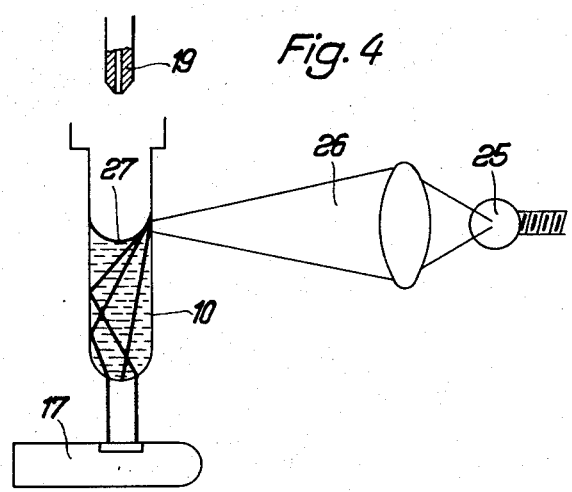

United States Patent Office 2,750,092
Patented June 12, 1956

2,750,092

APPARATUS FOR AUTOMATICALLY FILLING UNIFORM AND EXACT VOLUMES, IN PARTICULAR A FULLY AUTOMATIC COLLECTOR OF FRACTIONS

Wolfgang Grassmann, Regensburg, and Gottfried Deffner, Augsburg, Germany

Application May 25, 1953, Serial No. 357,768

Claims priority, application Germany May 27, 1952

15 Claims. (Cl. 226—96)

The present invention relates to a fully automatic collector of fractions, as is for example used in chromatography. In chromatography the eluate in successive fractions each of the same volume is collected and analyzed. Since such tests extend over considerable periods of time, the interchanging of the collecting vessels by hand is unpractical and necessarily leads to stopping the apparatus overnight. It was therefore the aim, to produce a fully automatic apparatus for collecting the fractions. For this purpose already several fractionating separators or condensers have been developed, which differ considerably in their usefulness and accuracy. Thus, for example, a fraction collector has already been proposed, in which the individual glass vessels are mounted on a disc, which is rotated by a twisted cord. The disc with the glass vessels is in a tank filled with water in which the collecting vessels float. The vessels which are not filled thus protrude so far upwards, that they abut against an obstruction, whereby the continued rotation of the disc is prevented. With the increasing weight resulting from the filling of the collecting vessel the latter gradually sinks lower into the liquid, slides past the obstruction and permits a further movement to the next glass vessel. This arrangement has various disadvantages, particularly in that all the glass vessels must have practically the same weight and the same shape, which is not easily realized. The main source of the error is due to the various friction resistances, to which the sinking glass vessel is subjected both in the bores of the disc as well as at the obstruction. It has therefore already been proposed, to develop an apparatus, where at set intervals a current impulse is produced by an electric clockwork mechanism, which automatically controls the apparatus and produces the further movement. In this case the control is in no way due to the liquid dripping out, but the change of the collector is undertaken at predetermined times. A prerequisite for obtaining equal volumes is thus a uniform speed of flow of the elution liquid. Since the speed of flow varies from solvent to solvent and also almost always alters during the course of the experiments, e. g. through swelling processes and the like, this condition is not realizable with certainty. Another proposed apparatus functions with a measuring device situated between the drip tube and collecting vessel. This apparatus is complicated and inaccurate on account of particles of liquid unavoidably remaining behind in the intermediate apparatus and therefore particularly unsuitable for measuring small volumes. Finally apparatus have also been proposed, wherein the switch mechanisms are released, as soon as a certain, adjustable, number of drops has left the discharge opening. The counting of the drops in this case is effected by means of a counting mechanism and by the use of electrical or photoelectrical accessories. The prerequisite for this arrangement, if it is to serve for measuring equal volumes, is that the size of the drops remains unchanged. However, this cannot be achieved, since the size of the drops depends on the solvent and the dissolved substances as well as the temperature and must therefore be subject to changes during the course of the experiment.

All these disadvantages are overcome with the apparatus according to the invention. According to the invention an apparatus is proposed for automatically filling equal and exact volumes, especially a fully automatic collector of fractions in which the change, e. g. change of direction, deflection or darkening of a preferably parallel or slightly converging beam of light in a moving liquid meniscus renders a switch mechanism operative when this liquid meniscus reaches a predetermined position. The beam of light is for instance directed onto a photocell, which is masked when the column of liquid rises and when the beam of light is interrupted and subsequently renders a switch mechanism operative. This apparatus is constantly subjected to the action of the beam of light and thus it may happen, that the switch mechanism can also be released by a light reduction of another type, e. g. by failure of the light source or by the dripping through of the drops of liquid through the condenser vessels. To overcome this disadvantage an insert at least approximating to the shape of a hollow cone is placed in the condenser vessel, and serves to deflect the drops of liquid to the walls of the condenser vessel, so that the liquid is distributed over the walls and a considerable weakening of the beam of light is avoided.

Particularly advantageous is one embodiment of the apparatus according to the invention, in which the photoelectric cell is mounted beneath the condenser vessel in the extension of its axis. A deflection of the beam of light passing horizontally through the glass is effected by the meniscus of the liquid column, so that it is conducted vertically downwards through the column of liquid and the glass towards the bottom of the vessel. The semicircular bottom of the glass vessel thereby functions as a condenser lens, so that a sharp spot of light is formed underneath the glass vessel. In consequence the photocell can now be mounted underneath the condenser vessel. It need not constantly be under the influence of a beam of light and only sets the switch apparatus into motion when the point of light impinges on it.

The condenser glass vessel can also be illuminated from below by a bundle of light rays masked for example by a slit whereby the light deflected to the side at the meniscus strikes a photoelectric cell mounted at the side of the glass vessel and effects the release of a switch mechanism. If the device according to the invention is used for a fractionating condenser, then the latter's condenser glass vessels are preferably mounted on a rotating disc, the intermittent motion of which is brought about by the impingement or the darkening of a beam of light on the photoelectric cell.

In the drawings an embodiment by way of example of the apparatus according to the invention is shown, and there is shown:

Fig. 1 a perspective view of the fully automatic fraction collector according to the invention;

Fig. 2 a vertical section through the fraction collector according to Fig. 1;

Fig. 3 a representation of a condenser vessel for use with the apparatus according to the invention;

Fig. 4 a diagrammatic view of the method of operation of a further embodiment of the apparatus according to the invention;

Fig. 5 is an illustration of a condenser vessel, which is illuminated from below and where the photocell is mounted at the side of the condenser vessel, and Fig. 6 is a diagrammatic view of a lifting device for the individual condenser vessels.

The fraction collector shown in Figs. 1 and 2 rests on a base plate 1, which is horizontally adjustable by means of adjusting screws 2. A column 4 extends upwardly from the centre of the base plate 1, and at its upper end carries a gear 5. Fixedly connected with the gear 5 is a shaft member 6, which supports a circular disc 8 fixed on top by means of a screw 7. This circular disc 8 is provided with recesses and/or bores 9, in which the condenser vessels 10 are placed. Suspended from the circular disc 8 is a ring 11 held by means of retaining bars 12, which is moved directly into the filling position of the glass vessels 10 by guide rollers 13 and 13 and which for the accommodation of the glass vessels has recesses or bores 14. The drive of shaft 6 takes place by means of a gear drive consisting of gears 15 and 5. The gear 15 is disposed in a housing 16 having clockwork. Opposite the guide rolls 13, 13 is a photoelectric cell 17 within the ring 11, upon which a beam of light 18 coming from a light source impinges. Now if the level of the liquid rises in the glass vessels 10 as a result of dripping of the liquid from the capillary tube 19, then it will eventually come into the path of the beam of light 18, so that the aperture of the photoelectric cell 17 is darkened. As a consequence an arrester 21 is released in a switch mechanism 20 via circuit means not shown and the circular disc 8 can rotate one step further, so that the next condenser vessel 10 comes beneath the capillary tube 19.

In Fig. 3 a condenser vessel for use with the apparatus according to the invention, is shown in simplified form. This glass vessel is widened at the top at 22 and accommodates a glass insert 23, in the shape of a hollow cone with three feet 24. This glass insert 23 which has at least approximately the shape of a hollow cone, has the purpose of distributing the drops falling thereon uniformly around the walls of the condenser vessel, so that the accidental release of the switch mechanism on account of a drop crossing the beam of light is avoided, which is of particular advantage, if a very darkly colored liquid is to be collected in the condenser vessel.

In Fig. 4 the operation of another embodiment of the apparatus according to the invention is shown diagrammatically. A bundle of light 26 is emitted from a light source 25, and is so concentrated by a lens system that inside the condenser vessel, there results a focal point preferably at the point of contact of the glass wall and meniscus. Beneath the condenser vessel is a photoelectric cell 17. Now if the level of the liquid rises to a precisely determined level, then a deflection of the light ray 26 passing horizontally through the condenser vessel 10 vertically downwards, results and it is conducted through the column of liquid and the glass towards the bottom of the vessel. The semicircular bottom of the glass vessel 10 thus functions as a condenser lens, so that a sharp spot of light is formed underneath the glass vessel 10. This spot of light strikes the photoelectric cell 17. As a consequence the magnetic stop 21 for the circular disc 8 is released by a relay switch 28 and the circular disc 8 can turn a step further so that the next condenser vessel 10 can come under the capillary tube 19.

The path of the rays between the lamp and photocell may naturally be reversed, as is shown in Fig. 5. A bundle of light 31 emanating from the light source 30 is concentrated by a condenser lens system and/or an apertured diaphragm in such a manner, that it impinges slightly convergent or divergent from below onto the semicircular bottom of the condenser vessel 10. From the rays reaching the meniscus, partly directly and partly by total reflexion at the walls of the vessel, those which reach the meniscus in its curved outer parts are transmitted sideways and strike a photoelectric cell mounted at the side of the condenser vessel.

In order always to lift the condenser vessels in the switch position to the same height and thus to render ineffective irregularities in the supporting ring 11 or the circular disc 8 the semicircular bottom 40 of the condenser vessel 10 can run over a curved rail 41 or the like, when it reaches the photoelectric cell position. This curved rail is preferably of a transparent material and is mounted either directly above the photoelectric cell 17, or, with an inverted path of the rays, above the light source 30 (see Fig. 5). Thus each glass vessel is raised to a height absolute with regard to the bottom, whereby the exact functioning of the device is further improved.

The advantage of the apparatus according to the invention is apparent, since as is known measuring processes with the aid of a beam of light and a photoelectric cell belong to the most accurate processes. It is today no longer difficult for a glassblower, to blow glass vessels, which have exactly corresponding volumes, so that the columns of liquid in the glass vessels 10 will in each case have the same volume. Naturally, the invention is not limited to a fully automatic fractionating condenser, but the changing of the direction and/or darkening of a lightbeam, preferably parallel or slightly convergent, when passing through a liquid meniscus interposed into the lightbeam can be used for releasing any desired switch mechanism.

What we claim is:

1. Apparatus for automatically filling equal volumes of liquid in a series of similar vessels which comprises a base, a carrier movably mounted on said base, means for supporting a series of said vessels spaced on said carrier, means for stepwise advancing said carrier, means for filling one of said vessels at a time with liquid, a photoelectric cell adjacent to one of said vessels, a switch operatively connected to said cell in a circuit including said advancing means, a light source adjacent to said one vessel and adapted to pass light therethrough, the cell, vessel and light source being so correlated that when the height of liquid in said one vessel reaches a predetermined point the light is bent by the surface of the liquid onto said cell, causing an electrical impulse through said switch to said advancing means, whereby said carrier is advanced sufficiently to locate another vessel in place of said one vessel.

2. Apparatus according to claim 1, in which said cell is underneath said one vessel and said light source is at the side thereof, so that light therefrom impinges at the top of the liquid.

3. Apparatus according to claim 1, in which said light source is underneath said one vessel and the light by an optical system is made parallel passing through said liquid and said cell is at the side thereof, so that said light is deflected by the surface of said liquid and onto said cell.

4. Apparatus according to claim 1, in which said light source is underneath said one vessel and the light by an optical system is made converging passing through said liquid and said cell is at the side thereof, so that said light is deflected by the surface of said liquid and onto said cell.

5. Apparatus according to claim 1, in which an insert at the top of said one vessel distributes drops falling thereon around the walls thereof to avoid accidental actuation of said switch.

6. Apparatus according to claim 1, in which said carrier comprises a disk having vessel retaining openings therein, and means for holding said disk against movement between steps.

7. Apparatus according to claim 1, in which said carrier is mounted for rotary movement.

8. Apparatus according to claim 7, in which said carrier is mounted on a central shaft, a motor adjacent thereto and gearing between said motor and shaft.

9. Apparatus according to claim 1, in which said carrier comprises a disk having vessel retaining openings therein, and a ring below said openings on which said vessels rest, and fixed to said disk by retaining bars.

10. Apparatus according to claim 9, in which guide rollers contact said ring.

11. Apparatus according to claim 1, in which a lens system concentrates said light so that the focal point thereof is at the point of contact of the wall of said vessel and the meniscus.

12. Apparatus according to claim 1, in which a curved rail under said one vessel permits said vessels as they reach a stop position to ride onto said rail, whereby the bottom of said vessels is held at a constant height.

13. Apparatus according to claim 12, in which said rail is of transparent material.

14. Apparatus according to claim 13, in which said rail is located on the window of said cell.

15. Apparatus according to claim 13, in which said rail is located over the light source.

References Cited in the file of this patent

UNITED STATES PATENTS 2,663,477     Bendz _____ Dec. 22, 1953